Dec. 11, 1945. J. A. PITTNER 2,390,553
METHOD OF MAKING TAPERED PAILS
Filed May 7, 1943

INVENTOR
JOHN A. PITTNER
BY
ATTORNEYS

Patented Dec. 11, 1945

2,390,553

UNITED STATES PATENT OFFICE 2,390,553

METHOD OF MAKING TAPERED PAILS

John A. Pittner, West View, Pa., assignor, by mesne assignments, to Continental Can Company, Inc., New York, N. Y., a corporation of New York Application May 7, 1943, Serial No. 485,983

4 Claims. (Cl. 43—120).

My invention relates to a method and apparatus adapted for use in the manufacture of pails and similar articles made of sheet material. The invention provides a novel method of stretching and manipulating a cylindrical body to give it a tapered form. As herein illustrated, the invention is particularly adapted for stretching the cylindrical sheet metal body of a pail or like article to a tapered form.

In the manufacture of sheet metal pails or containers of tapered or frusto-conical form, it is customary to cut the blanks for making the bodies from sheet metal, in an arc or curved shape such that when rolled to bring the ends of the blank together, the article has the required tapered form. Owing to the shape of the blanks, this method results in a large amount of waste material.

An object of the present invention is to avoid such waste, and to this end the invention provides a method by which the body of the article or container can be made in cylindrical form from a straight blank and thereafter stretched and reshaped to give it the required tapered form.

In the manufacture of sheet metal bodies for making pails and the like, the blank is rolled and the end edges are overlapped and welded together. If it is attempted to stretch the cylindrical body to a tapered form, the welded seam presents a difficulty as the metal at the seam does not stretch so readily and there is a tendency for the seam to give way under the strain of the stretching operation; such strain being applied primarily and mainly at the end of the seam. This difficulty is increased owing to the usual welding methods, because the weld at the end portion of the seam is comparatively weak. An object of the invention is to provide a method by which these difficulties are overcome.

Other objects of the invention will appear hereinafter.

Referring to the accompanying drawing.

Figure 1:
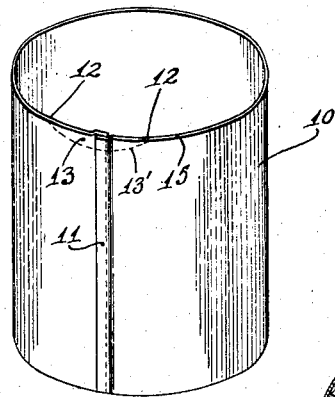
Fig. 1 is a perspective view of a cylindrical body designed for use in making a pail.

Referring to the drawing which illustrates the method of forming the tapered body of a pail or the like, a cylindrical body 10 (Fig. 1) is formed from a rectangular sheet metal blank rolled to cylindrical form with the end edges overlapped and welded to form a seam 11. A narrow strip 13 comprising the upper end portion of the seam is then sheared off along the dotted line 13', in any approved manner, as for example, in a horn press. The line of severance is slightly curved so that it cuts the rim 15 of the cylinder at the points 12. The rim of the cylinder between the points 12 is then bent over or curled as by means of a curl punch to form a curled lip 14 including the upper portion of the seam 11.

By shearing off the strip 13 the weakened end portion of the seam is removed. The manipulation of the metal in the operation forming the lip 14 softens the metal which has been more or less hardened by the sudden chilling of the metal at the completion of the welding operation. This softening of the metal permits the lip to be stretched and uncurled when the cylinder is stretched as hereinafter described. Owing to the lip 14, the stretching force tending to disrupt the seam is transferred from the upper end of the seam to a point below or away from said end, which greatly reduces the tendency to separate the edges of the metal at the seam.

Figures 4, 5:
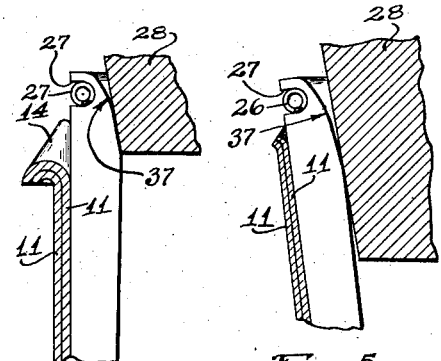
Fig. 4 is a detailed sectional view showing the curled rim portion at the commencement of the stretching operation.
Fig. 5 is a similar view showing the metal partly uncurled.

During this stretching operation, the lip 14 is gradually uncurled. Fig. 5 shows the lip partly unrolled at an intermediate stage during the stretching operation. The uncurling of lip 14 brings the edge thereof up to the level of the cylinder rim. It will be noted that the strip 13 which is sheared off, is of a depth to compensate for the stretching of the lip 14 so that at the completion of the stretching operation, the rim 15 has been restored to its circular form.

Figure 7:
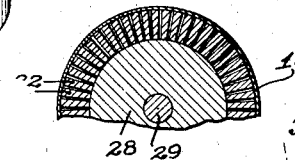
Fig. 7 is a section at the line 7—7 on Fig. 6.
Figure 2:
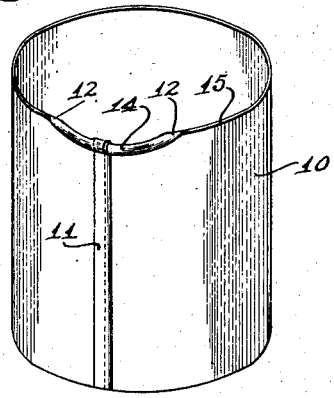
Fig. 2 is a similar view showing a portion of the rim adjacent the seam curled over.
Figure 6:
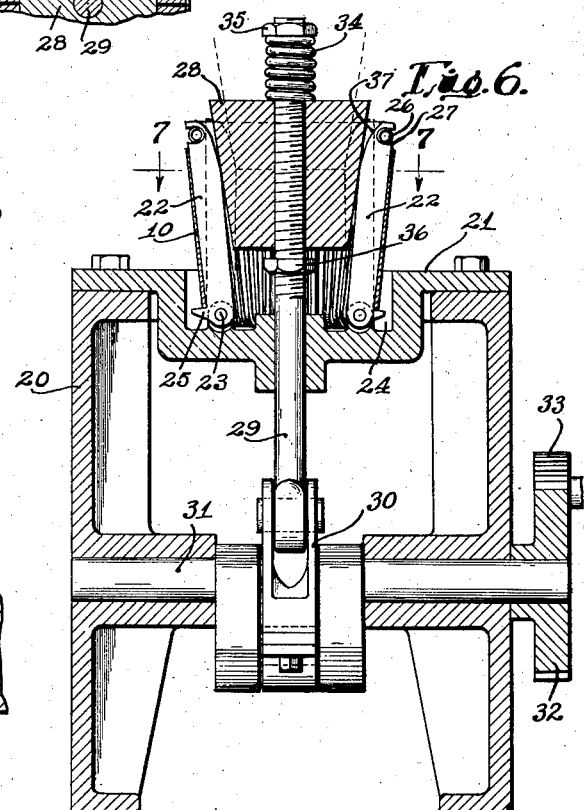
Fig. 6 is a sectional elevation of the stretching apparatus.

Referring to Figs. 6 and 7, the stretching apparatus comprises a frame 20 on which is bolted a top plate 21. Expander fingers 22 are arranged in an annular series and pivotally mounted at their lower ends on a bearing ring 23. The series of fingers is supported within a recess 24 in the plate 21. The fingers 22 are in the form of flat bars which are preferably close together, so that when in vertical position, their exterior surfaces provide a substantially or approximately continuous cylindrical wall surface.

The set of stretching fingers 22 as a whole, provides an expansible support for holding the sheet metal cylinder 10 during the stretching operation.

The fingers are formed with lugs 25 at their lower ends to provide a bottom support for the cylinder 10. The upper ends of the fingers are drawn inwardly by a coil spring 26 which extends circumferentially of the group of fingers and is seated in recesses 27 formed in the upper ends of the fingers.

An expander 28 of frusto-conical shape is slidably mounted on a vertical rod 29, the lower end of which is connected through a link 30 to an eccentric or crank on a crank shaft 31 journalled in the frame 20. A spur gear 32 is keyed to the shaft 31 and is driven by a pinion 33. A coil spring 34 mounted on the rod 29 is held under compression between the expander head 28 and a nut 35 threaded on the rod. A stop nut 36 is also threaded on the rod 29 below the head 28.

Figure 3:
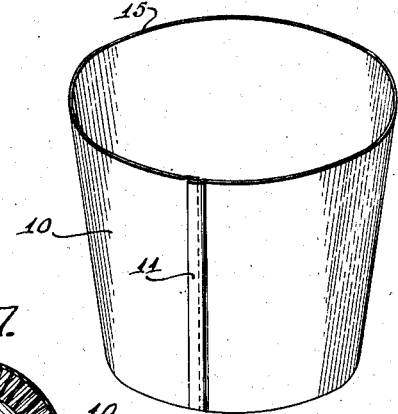
Fig. 3 is a similar view showing the said body after being stretched to tapered form.

*Operation.*—The expander 28 is moved to its uppermost position which permits the fingers 22 to swing inwardly to a substantially vertical position as shown in dotted lines (Fig. 6). A cylinder 10 is then placed in position with its lower edge resting on the lugs 25. The shaft 31 is then rotated to draw the expander head 28 downward, causing it to act as a wedge or cam for spreading the expander fingers 22. The inner surfaces of the fingers which contact with the head 28, are preferably formed with curved portions 37 adjacent their upper ends, which permits a more nearly uniform rate of stretching of the metal. As the rod 29 and expander 28 are moved downwardly, the expander fingers 22 are swung outwardly by the wedging or camming action of the head 28, thereby stretching the walls of the workpiece so that it is drawn to the tapered form shown in Fig. 3. During this stretching, the curled lip 14 is unrolled or uncurled, bringing it back into conformation with the general contour of the work-piece.

The lip 14 during the process of its formation is stretched a certain amount in a direction transverse to its length. This would tend to bring the edge of the lip when uncurled, above the level of the rim 15. This stretching is compensated for by the removal of the strip 13 prior to the formation of the lip, so that when the lip has been uncurled as above described, it is brought substantially into line with the rim 15.

I claim:

1. The method which comprises rolling a blank of sheet material to cylindrical form with the ends of the blank overlapping, welding said overlapping ends together to form a seam extending lengthwise of the cylinder, curling a portion of the rim of the cylinder which extends across the seam at one end of the cylinder, and applying an expanding force within the cylinder at said end by which the rim portion at said end is stretched and its diameter increased, and by which said curled portion is uncurled.

2. The method which comprises rolling a blank of sheet material to cylindrical form with the ends of the blank overlapping, welding said overlapping ends together to form a seam extending lengthwise of the cylinder, shearing from the rim at one end of the cylinder a narrow strip including an end portion of said seam, curling the rim of the cylinder outwardly and downwardly along the line of severance of said strip, and thereafter stretching the cylinder to a tapered form in which said end is expanded, by forces applied in radially outward directions to the interior surface of the cylinder and causing said curled portion to be uncurled by said stretching of the cylinder.

3. The method of treating a body made of sheet material formed by rolling a blank of the material, bringing the ends of the blank together and uniting them in a seam extending from one rim of said body, which method comprises severing from said body a narrow strip extending along said rim and including an end portion of the seam, curling outwardly the portion of the rim from which said strip has been severed and thereby stretching the material forming said curled portion, and thereafter applying an expansive force to the interior surface of said body along said rim and thereby expanding the material and simultaneously uncurling said curled portion.

4. The method which comprises rolling a blank of sheet metal to cylindrical form with the ends of the blank brought together, welding said ends together to form a seam extending lengthwise of the cylinder, applying an annular series of shaping surfaces to the interior surface of the cylinder with each of said shaping surfaces extending lengthwise of the cylinder and in contact with said interior surface, said shaping surfaces together forming a substantially cylindrical surface co-extensive circumferentially and lengthwise with said interior surface of the cylinder, swinging all of said shaping surfaces individually and simultaneously outwardly, each about a fixed fulcrum closely adjacent to the lower end of the cylinder and thereby stretching the cylinder to a tapered form, severing from the cylinder after the same has been formed and prior to said stretching operation, a narrow strip of the material extending along the rim of the cylinder at the end thereof to be expanded and including with said strip an end portion of the seam, and curling outwardly the rim portion from which the strip has been severed and thereby stretching the metal forming said curled portion, and causing said curled portion to be uncurled by said stretching of the cylinder.

JOHN A. PITTNER.